United States Patent

[11] 3,598,081

| [72] | Inventor | John J. Van Houten<br>Anaheim, Calif. |
|---|---|---|
| [21] | Appl. No. | 780,039 |
| [22] | Filed | Nov. 29, 1968 |
| [45] | Patented | Aug. 10, 1971 |
| [73] | Assignee | Advanced Technology Center, Inc.<br>Grand Prairie, Tex. |

[54] PNEUMATIC SOUND GENERATOR
7 Claims, 4 Drawing Figs.

[52] U.S. Cl. .................................................. 116/137, 340/15
[51] Int. Cl. ................................................... B06b 3/00
[50] Field of Search .......................................... 116/137, 137 A, 142, 143, 142 FV, 142 FP; 181/0.5; 340/404, 5, 14, 15

[56] References Cited
UNITED STATES PATENTS

| 606,668 | 7/1898 | Hunter | 116/137 |
| 1,742,380 | 1/1930 | Farmer | 116/142 |
| 2,944,509 | 7/1960 | Shintaku | 116/142 |

FOREIGN PATENTS

| 473,294 | 3/1929 | Germany | 116/138 |

Primary Examiner—Louis J. Capozi
Attorney—H. C. Goldwire

ABSTRACT: A noise generator capable of producing random, wide-frequency band noise and in which at least one jet of air is directed against a surface of a body such that the air jet is broken up into intense turbulence and such that noise is produced. In a preferred embodiment, the body is immovably located within the throat of an acoustic horn, and air jets directed against the body produce noise which is efficiently coupled, by the horn, with the atmosphere ambient to the horn mouth.

JOHN J. VAN HOUTEN
INVENTOR.

BY H.C. Goldwire
ATTORNEY.

PNEUMATIC SOUND GENERATOR

This invention relates to sound generators and, more particularly, to broad-frequency-band noise generators. The invention is suitable for use in the testing of various devices in a high-amplitude noise environment and, in particular, in the testing of reduced-scale models of high-speed aircraft and missiles.

Modern, high-speed aircraft and missiles are often subjected to severe vibrational stresses induced by high-intensity noise encountered especially in takeoff and flight. Such noise is caused both by the jet or rocket engines employed and by boundary layer turbulence which occurs as such a craft passes through the atmosphere at high speeds, particularly at speeds near or above the speed of sound. As is well known in the art, the noise resulting from boundary layer turbulence increases greatly as flight velocity increases and, at supersonic speeds, it may induce, in various components of a respective craft, vibrations of such intensity that they become a major problem because of their effects on structure. Noise encountered by a missile or an aircraft in flight typically comprises random vibrations occuring over a wide range of frequencies, i.e., "white noise"; thus, in testing components for susceptibility to such noise-induced vibration by exposing them to high-intensity noise, it is normally required that a noise-generating apparatus be used which produces noise having consistently high intensity over a wide range of frequencies. For convenience and economy, it is often desirable to perform such tests upon reduced-scale models of the vehicle or component to be tested, in which case the applied noise must be increased in frequency (such that the uppermost and lowermost frequencies of the noise spectrum are raised) by a factor inversely proportional to the reduction in scale in order to achieve test results equivalent, in important regards, to those obtained in the testing of the full-scale unit at normal frequencies. In the testing of such reduced-scale models, it is typically necessary that the noise source be capable of producing a sound-field of random noise occurring over the range, for example, of from a few hundred to 50,000 cycles per second and at an amplitude, for example, exceeding 110 decibels (i.e., 0.0002 dynes/cm.$^2$).

Previous noise generators used for aircraft testing have been largely of the electromagnetic type in which an electromagnetic driver is powered by electronic circuitry which generates an electrical signal containing the required broad spectrum of frequencies. Such electrodynamic drivers are unable, however, to produce noise of sufficient intensity at the high frequencies required for testing reduced-scale models. They have the further disadvantage of including undesirably delicate moving parts such as flexible centering-spiders and diaphragms. Electrostatic loudspeakers have been developed which are capable of operation in the high frequency range required (20,000 to 50,000 Hz. and above), but they are incapable of satisfactory operation at the intensity levels required at lower frequencies (e.g., below 10,000 Hz.). Also, electrostatic speakers employ fragile, resiliently suspended diaphragms and are thus undesirably sensitive to handling and to mechanical shock and vibrations.

Another and more promising approach to such testing is the use of pneumatically powered noise generators. In such devices, the noise is produced by at least one jet of gas as it emerges from a nozzle and moves at high velocity through relatively quiescent air; and no electrical circuit is required. In one such design, two mutually spaced nozzles are directed toward one another such that respective air jets emerged from the nozzles intersect each other. Although existing pneumatic noise generators do produce random noise occurring over a wide frequency-band, they do not produce noise of sufficient intensity for the satisfactory testing of aircraft components unless they are horn-loaded or unless the component to be tested is positioned immediately adjacent the noise generator and both are contained within a closed chamber (an arrangement unsatisfactory for the testing of relatively large components where, for example, it may be necessary to expose a relatively large surface to the noise source). Preferably, the noise generator includes an acoustic horn which directs the noise toward the component to be tested and improves the coupling of the noise source with the air ambient to it. However, previous attempts to use acoustic horns with pneumatic noise generators have not been successful because of difficulties encountered in providing satisfactory acoustic coupling between the respective horns and noise generators. In one such device, for example, jets of air are directed against each other within a pipe connected to the throat of a horn. The device does not produce the required consistency of noise intensity over a broad-frequency spectrum; for, as is known in the art, sound generated within a chamber, such as the interior of a pipe, tends to resonate or to form standing waves which cause peaks of relatively high-intensity sound at particular frequencies in the sound spectrum. Thus, successful coupling of a pneumatic noise generator to an acoustic horn, whereby the horn projects the complete range of sound generated and wherein no undesirable peaks occur at particular frequency bands, has not been achieved. A further, undesirable feature of the above-described pneumatic noise-producing devices is that there is no efficient direction of the air toward the outlet, or mouth, of the horn. Rather, the air simply accumulates within the pipe such that increased air pressure forces it through the horn.

It is, accordingly, a major object of the present invention to provide a new and improved apparatus for generating white noise of consistently high intensity over a wide frequency-range.

Another object is to provide such a noise-generating apparatus which, nonetheless, is of simple, rugged construction and which has no moving parts.

Yet another object is to provide a horn-loaded, pneumatically powered noise generator in which resonance-produced peaks in the projected sound are avoided.

A further object is to provide a horn-loaded, pneumatically powered noise generator in which gas flowing into a horn is efficiently conducted through the horn.

A still further object is to provide an improved method of producing noise of consistently high intensity over a broad range of frequencies.

Other objects and advantages will be apparent from the specification and claims and from the accompanying drawing illustrative of the invention.

Figure 1:
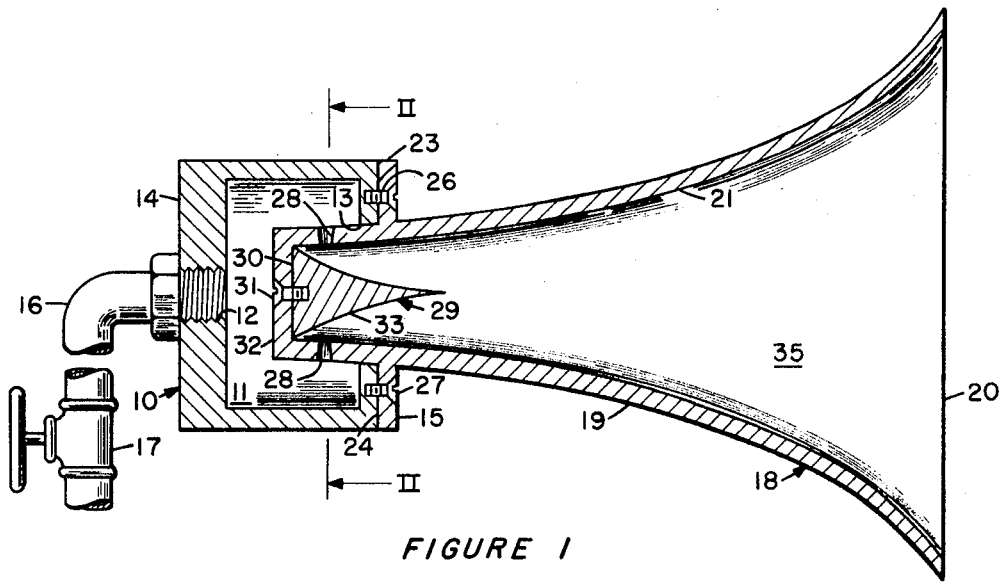
FIG. 1 is a sectional, longitudinal view of a preferred embodiment of the invention together with a plan view of an associated valve.

With reference to FIG. 1, a housing 10 enclosed a plenum chamber 11 and has an inlet 12 and an opening 13, both the inlet and the opening being in communication with the plenum chamber. The housing 10 comprises a sidewall suitably of generally cylindrical configuration and having first and second ends which are each substantially closed by a respective one of a spaced pair of end portions or walls comprising first and second end portions 14, 15. In the preferred embodiment, the inlet 12 and the opening 13 are each circular, the inlet being formed centrally of and through the first end portion 14 and the opening being formed centrally of and through the second end portion 15. A conduit 16 is threadingly engaged with the inlet 12 and communicates between the plenum chamber 11 and a control valve 17 which, in turn, is in communication with a source (not shown) of gas under pressure (e.g., of air at 50—90 p.s.i.).

An elongated, tapered structure 18, which has a sidewall 19 of the general configuration of an acoustical horn, a large open end 20, and a small end closed by a transversely extending end portion 32, is mounted on the housing 10 such that it sealingly extends, at its small end, through the chamber opening 13 and within the plenum chamber 11. The tapered structure 18 has an inner side surface 21 and, at its end portion 32, provides an inner, laterally extending end-surface of the tapered structure 18. The structure 18 is also provided with an annular flange 23 located between and spaced from the structure ends 20, 34, extending radially outwardly from the structure sidewall 19, and having, on one side, a substantially flat, annular surface 24 perpendicular to the longitudinal axis of the structure 18 and facing toward the small end 34 of the structure 18. The flange flat surface 24 sealingly seats against a corresponding, substantially flat, outer surface of the housing 10 formed on the housing second end portion 15. The annular flange 23 is provided with a plurality of bores 26 which extend through the flange 23 perpendicularly of its flat surface 24, the bores being mutually spaced along the flange 23. The tapered structure 18 is affixed to the housing 10 by a plurality of bolts 27 which extend through the bores 26 and threadingly engage corresponding bores formed in the housing second end portion 15. Alternatively, the flange 23 may be affixed to the housing 10 by other means, such as brazing or welding. In any case, it is necessary that the tapered structure 18 be sealingly associated with the opening 13 of the housing 10 such that substantially no air leakage may occur from the plenum chamber 11, through the opening 13, and around the tapered structure 18. The flange 23 is spaced along the longitudinal axis of the tapered structure 18 and from the small end 34 of the structure 18 such that, upon the flange flat surface 24 seating against the flat, outer surface 25 of the housing 10, the small end 34 of the structure 18 is disposed between and spaced from the first and second end portions 14, 15 of the housing.

At least one, and preferably a plurality of, outlet orifices 28 is provided, each orifice being formed through the wall 19 of the tapered structure 18 at a portion thereof spaced from and lying between the second end portion 15 of the housing 10 and the small end 34 of the tapered structure 18. The orifices 28 are identical in size, or they may be of slightly differing diameters. With added reference to FIG. 2, the orifices 28 are mutually spaced around the tapered structure 18 in a generally annular array and are suitably of frustoconical configuration, each having an axis extending radially outwardly from the longitudinal axis of the tapered structure. Each orifice 28 is preferably tapered such that it converges in the direction, along its axis, toward the interior of the tapered structure 18. The conduit 16 (FIG. 1), valve 17, and inlet 12 are each of an inner, cross-sectional area substantially larger than the total of the cross-sectional areas of all the orifices 28 (each respective orifice area being taken as that of the most narrow portion of the respective orifice) in order to minimize resistance to any flow of gas from the source of gas under pressure to the orifices; preferably, the conduit 16, valve 17, and inlet 12 are of respective areas of from two to four times the total of the cross-sectional areas of the orifices 28. Also, the portion of the structure 18 which extends within the chamber 11 is spaced from the housing 10 (except at its juncture with the housing second end portion 15) such that substantially unrestricted gaseous flow is permitted within the chamber 11 from the inlet 12 to the orifices 28.

A body 29 having a base 30 and a longitudinal axis perpendicular to the base is mounted within the tapered structure 18 and on the tapered structure end portion 32 such that it is intersected by the respective axes of the orifices 28 and, preferably, such that the orifice axes extend radially outwardly from the body axis. The base 30 of the body 29 is configured and disposed such that it seats against and substantially covers the structure inner, laterally extending end-surface provided by the end portion 32. The body 29 is affixed to the tapered structure 18 by means such as a screw 31 which extends through a bore formed coaxially of the tapered structure 18 and through its end portion 32 and threadingly engages a corresponding bore extending within the body 29. The body 29 is of decreasing cross section, along its axis, in the direction toward the large end 20 of the structure 18 and it is preferably conoidal, with (for example) an exponential taper. The body 29 has a side surface 33 annularly spaced from the inner side surface 21 of the structure 18, thus adjacently spaced from the orifices 28. The side surface 33 of the body 29 is disposed such that the structure inner side surface 21, in cooperation with the body side surface 33, defines a portion of an acoustical horn 35 with a cross-sectional area which increases continuously (for example, exponentially) in the direction, along the structure axis, from the small end at wall 32 (i.e., the horn throat) to the large end 20 (i.e., the horn mouth) of the structure 18.

Given that
$B = (2\pi f_0/C) \cdot x$ where C is the speed of sound, $f_0$ is the lower cutoff frequency of the horn, and $x$ is the distance from the horn throat of a station at which horn cross-sectional area is to be determined, then the horn of this invention is of a shape included in the horn-family termed herein "hyperbolic" and governed by the equation
$A = A_0 (\cosh B + T \sinh B)^{1/2}$ where $A$ is the cross-sectional area at the station at $x$ distance from the horn throat, $A_0$ is the cross-sectional area of the horn at its throat, $B$ is as defined above, and $T$ is the taper-rate of the horn wall. Where $T=1$ the horn is "exponential" (i.e., has an exponential rate of change of area with axial distance). Values of $T$ lying in the range between 0.5 and 1 result in tapers which are satisfactory for use in the present invention. The central body 29 cooperates with the wall 21 in determining rate of change of horn area within the length of the central body.

Portions of the central body side surface 33 are confronted by respective ones of the orifices 28, and it is necessary that the side surface 33 be athwart the respective axes of the orifices 28 and that each portion of the surface 33 which is confronted by one of the orifices 28 be substantially skewed from the respective orifice axis. These portions of the surface 33 are also sloped negatively from any "$x$" axis extending through that surface portion parallel to the longitudinal axis of the tapered structure (considering the respective orifice axis to be the "$y$" axis). That is, the portions of the side surface 33 confronted by respective ones of the orifices 28 are sloped inwardly, or away from the respective orifice in the direction along the structure axis toward the large end 20 of the structure 18.

Figure 4:
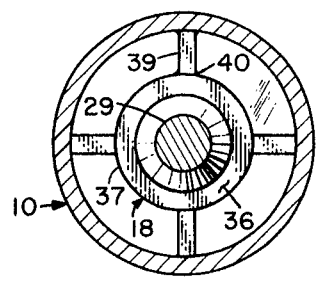
FIG. 4 is a cross-sectional view taken in the plane designated by the line IV–IV in FIG. 3.
Figure 3:
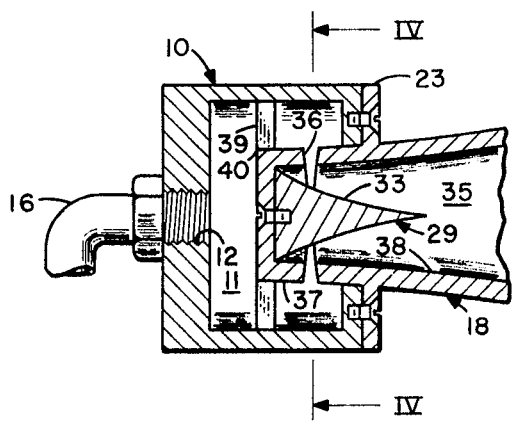
FIG. 3 is a sectional view, similar to that shown in FIG. 1, of a portion of an alternative embodiment of the invention.

Referring now to FIG. 3, a modified embodiment of the invention is similar to that shown in FIG. 1 and also comprises a housing 10 enclosing a plenum chamber 11, a tapered structure 18 mounted on the housing 10, and a body 29 immovably located within the tapered structure. In place of the outlet orifices 28 (FIG. 1), however, an annular slit 36 is formed through the tapered structure 18, the slit lying generally along a plane perpendicular to the longitudinal axis of the body 29 and extending peripherally of the tapered structure 18 and of the throat of the horn 35. The slit 36 is disposed, in relation to the body 29 and housing 10, similarly to the array of orifices 28 of FIG. 1 and, as in the embodiment of FIG. 1, is of an effective cross-sectional area smaller than the cross-sectional areas of the inlet channel comprising the inlet 12 and conduit 16. The slit 36 thus divides the tapered structure 18 into first and second sections 37, 38, the first section being disposed completely within the plenum chamber 11. A plurality of mutually spaced supporting members 39 is provided for rigidly attaching the first section 37 to the housing 10 and for immovably supporting the first section in register with the second section 38. With added reference to FIG. 4, the supporting members 39 extend radially from the periphery of the first section 37 of the structure 18 to the housing 10 and are rigidly affixed to the housing and to the structure first section 37 by means such as welding 40. With continued reference to FIG. 3, the slit 36, as viewed cross-sectionally, preferably converges as do the orifices 28 described in reference to the embodiment of FIG. 1.

In operation, the control valve 17 (FIG. 1) is opened to allow air or other gas under pressure from the source (not shown) to enter the plenum chamber 11 through the conduit 16 and inlet 12, and flow through the orifices is thus induced. Because, as mentioned above, the conduit 16 and inlet 12 are each of a cross-sectional area substantially larger than the total cross-sectional area of the orifices 28, relatively little resistance to the flow of air occurs upstream of the orifices 28. Because of principles known in the art, the converging orifices 28 shape the escaping air into respective, high-speed air jets coincident with the respective orifice axes. These jets of air thus impinge upon the body 29 at its side surface 33, since the orifices 28 are oriented with their respective axes intersecting the body.

As is known in the art, each of such air jets includes a central portion of relatively laminar airflow along the axis of the respective orifice 28, the central portion being surrounded by layers of turbulence created by the air jet as it shears through the air ambient to it. This turbulence is a source of pressure fluctuations which produce random or white noise extending over a wide band of frequencies, and acoustical waves of the noise thus generated are propagated generally along the axis of the respective air jet. As each air jet impinges upon the side surface 33 of the body 29, the jet is broken up into greatly increased turbulence, and further turbulence-produced noise is thus created. Because the side surface 33 of the body 29 is negatively (or inwardly) sloped, as previously described, the air of the jets impinging thereon is deflected in the general direction of the large end 20 of the tapered structure 18. However, because the body surface 33, at portions thereof confronted by respective ones of the orifices 28, is also substantially skewed from the respective axes of the immediately confronting orifices, the jets are also substantially broken up into intense turbulence which produces white noise of consistently high intensity over a wide frequency-range. The acoustic waves associated with the respective jets and with the turbulences into which the jets are transformed are deflected, by the side surface 33 of the body 29, in the same general direction; that is, toward the large end 20 of the structure 18. Thus, the airflow and the sound are effectively directed toward the mouth of the horn 35. While the precise nature of the turbulent reaction of the air jets as they impinge upon, and are deflected by, the side surface 33 of the body 29 is not fully known, it is known that profound changes of a widely varying nature occur, and that a wide range of high-intensity white noise is produced. If the orifices 28 are formed of slightly varying diameters, the range of sound is extended, for the larger orifices produce jets which tend to produce sound of a somewhat lower frequency.

It is preferred that the acoustical horn 35 defined by the side surface 33 of the body 29 and the inner side surface 21 of the structure 18 expand in the manner described above because, as is known in the art, such horns provide efficient acoustical coupling over a relatively wide range of frequencies. Note that if the body 29 is formed with such a taper, that portion of the tapered structure wall 19 in register with the body does not define a total volume having the desired rate of expansion, but (as inferred above) cooperates with the body 29 to form an enclosed, volume having the desired rate of expansion and of annular cross section. Other configurations may be used for the body 29 and the wall surface 21, provided that they define a suitable acoustical horn and that the side surface 33 of the body 29 is athwart the respective axes of the orifices 28. For example, the body 29 and wall 21 may be of rectangular cross section, rather than circular, and thus define a horn 35 of generally rectangular cross section and of annular cross section. Both to enable it to withstand the pressure differential across it and to substantially prevent conduction of sound through it, the body 19 is of strong, substantially rigid construction in the region of orifices 28. Further, while the noise generator has been thus far described as horn-loaded, the turbulence-produced noise caused by the air jets as they impinge upon the body 29 is of such intensity that, for some applications, no horn loading is required. That is, jet nozzles in communication with air under pressure and immovably disposed adjacent a body 29 having a side surface 33 athwart and substantially skewed from the respective nozzle axes direct air jets toward the body to cause turbulence-produced noise of such intensity and frequency distribution that, for some applications, the tapered structure 18 and enclosed acoustic horn 35 are not required.

The construction described produces high-level noise of improved uniformity of frequency distribution over a wide range when the rate of airflow through the orifices 28 is less than sonic. But it is an important aspect of the invention that more even frequency distribution throughout a markedly broader band of noise is obtained by supplying air into the plenum chamber 11 under pressure sufficient to induce flow from the chamber 11 and through the orifices 28 at sonic rate, thus achieving "choke" flow through the orifices 28. Pressure fluctuations developed in the piping 16 and chamber 11 essentially are not communicated through the sonic nozzle 29, since they are significantly less intense than those created by the action of a high speed flow on the body 29. Frequency distribution of the sound output is thus essentially free of the peaks that otherwise would accompany the upstream pressure fluctuations.

Figure 2:
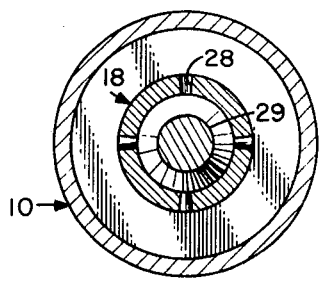
FIG. 2 is a cross-sectional view taken in the plane designated by the line II–II in FIG. 1.

With reference now to FIG. 3, the modified embodiment operates similarly to that shown in FIGS. 1 and 2, the air or gas under pressure being successively conducted through the inlet 12 and the plenum chamber 11 to the annular slit 36, from which it flows inwardly toward the body 29 and generally along a plane perpendicular to the axis of the body 29. The side surface 33 of the body 29 breaks up the inward flow of air into intense turbulence and deflects the flow and sound generally toward the large end 20 (FIG. 1) of the structure 18.

With added reference to FIG. 1, because the acoustical horn 35 extends from the base 30 of the body 29 to the large end 20 of structure 18 and because the noise is originated within the small end of the horn 35, effective acoustical coupling is provided between the noise source (that is, the turbulence surrounding the air jets and that produced upon their impingement on the body 29) and the atmosphere confronted by the large end 20 of the structure 18, i.e., by the mouth of the horn 35. Thus, the advantages provided by horn loading, e.g., concentration and direction of the sound and increased low frequency response through improved acoustic coupling, are fully realized. The sonic nozzle 28 does not provide a significant acoustical connection to the throat of the horn 35 (i.e., the small end 34 of the structure 18) into which the air jets, when of sonic velocity, are directed. Thus, the problem, inherent in the prior art, of resonance or standing waves produced by sound generated within such a cavity is eliminated, and the undesirable peaks in the sound spectrum caused by such standing waves are avoided. Instead, the sound is produced entirely within the horn 35 itself and is reflected, by the side surface 33 of the body 29 and the inner surface 21 of the structure 18, toward the large end 20 of the structure 18. Because the air jets, broken up upon their impingement upon the body 29, are deflected toward the large end 20 of the structure 18, the air flows quickly from the small end 34 to the large end 20 of the structure 18 and the airflow itself helps to carry the sound energy toward the large end 20. In contrast and as mentioned above, previous pneumatic noise generators achieve no such beneficial direction of the airflow; rather, they merely direct the air into a chamber connected to a horn such that increased pressure within the chamber forces the air to flow out of the chamber and through the horn. The present apparatus has the further advantages of having no moving parts and of being of relatively simple construction as compared with the electrodynamic and electrostatic noise producers previously described, of having no moving parts, and of being of relatively simple, rugged construction. Therefore, it may be used in environments where extremes of temperature or vibration would preclude the use of such electrically powered devices.

While only one embodiment of the invention, together with modifications thereof, has been described in detail herein and shown in the accompanying drawing, it will be evident that various further modifications are possible in the arrangement and construction of its components and in the steps of its method without departing from the scope of the invention.

What I claim is:

1. A noise-producing apparatus, comprising:
   a source of gas under pressure;
   a structure having a plenum chamber in communication with the source of gas under pressure and having at least one outlet, whereby gas under pressure from the source enters the plenum chamber and escapes therefrom through the outlet, the outlet having an axis and being adapted to form, along its axis, a jet of the escaped gas; and
   a body immovably located with respect to the at least one outlet and having a surface which is athwart the axis of and adjacently spaced from the outlet, the surface being substantially skewed from the axis, whereby the jet of gas emerged from the outlet is turbulently deflected by the surface, and the body being immovably located within a wall which, in cooperation with the surface of the body, defines an acoustical horn which is closed at its small end, the body being located within the horn adjacent the small end thereof, and the body surface being sloped, in the direction toward the large end of the horn, inwardly from the orifice.

2. The apparatus of claim 1, wherein the acoustical horn is of circular cross section and wherein the body is of conoidal configuration.

3. The apparatus of claim 1, wherein the horn defined by the wall and the body surface is a hyperbolic, acoustical horn.

4. The apparatus of claim 1, wherein the body is of a cross-sectional area which decreases along the body axis in the direction from the small end toward the large end of the horn.

5. The apparatus of claim 1, wherein the body and the horn, in the region of its small end, have longitudinal axes which are mutually coincident and wherein the at least one outlet extends from the plenum chamber through the wall of the horn and with its axis disposed substantially perpendicularly to the axis of the horn in the region of its small end, the body being of continuously decreasing cross section in the direction, along the horn, from the small end to the large end of the horn, whereby gas flowing from the outlet is deflected, by the body surface, toward the large end of the horn and conducted smoothly to the horn large end, and whereby the formation of acoustical standing waves within the horn is substantially eliminated.

6. A noise-producing apparatus, comprising:
   a source of gas under pressure;
   a structure having a plenum chamber in communication with the source of gas under pressure and having at least one outlet, whereby gas under pressure from the source enters the plenum chamber and escapes therefrom through the outlet, the outlet having an axis and being adapted to form, along its axis, a jet of the escaped gas, the plenum chamber being defined at least in part by a wall and the at least one outlet comprising a convergent nozzle extending through the wall and providing communication between the wall and the exterior of the chamber; and
   a body immovably located with respect to the at least one outlet and having a surface which is athwart the axis of and adjacently spaced from the outlet, the surface being substantially skewed from the axis, whereby the jet of gas emerged from the outlet is turbulently deflected by the surface, and the body having a longitudinal axis and wherein the at least one outlet comprises a plurality of mutually spaced outlets, each of which outlets extends from the plenum chamber and through the wall of the horn and whose respective axes extend generally radially from the body axis.

7. The apparatus of claim 6, at least one of the plurality of orifices being of a cross-sectional area different than that of at least one of the other orifices.